United States Patent
Steiner (10) Patent No.: US 8,245,212 B2
(45) Date of Patent: Aug. 14, 2012

(54) BUILDING CALL TREE BRANCHES AND UTILIZING BREAK POINTS

(75) Inventor: Steven J. Steiner, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1210 days.

(21) Appl. No.: 12/035,602

(22) Filed: Feb. 22, 2008

(65) Prior Publication Data

US 2009/0217297 A1 Aug. 27, 2009

(51) Int. Cl.
*G06F 9/45* (2006.01)
*G06F 9/44* (2006.01)

(52) U.S. Cl. .................. 717/158; 717/129; 717/149

(58) Field of Classification Search .......... 717/124–129, 717/144–149, 157–159
See application file for complete search history.

(56) References Cited

U.S. PATENT DOCUMENTS

| | | | | |
|---|---|---|---|---|
| 5,179,702 A | * | 1/1993 | Spix et al. | 718/102 |
| 5,842,017 A | * | 11/1998 | Hookway et al. | 717/158 |
| 5,930,509 A | * | 7/1999 | Yates et al. | 717/159 |
| 5,999,734 A | * | 12/1999 | Willis et al. | 717/149 |
| 6,003,143 A | | 12/1999 | Kim et al. | |
| 6,338,159 B1 | | 1/2002 | Alexander et al. | |
| 6,493,868 B1 | * | 12/2002 | DaSilva et al. | 717/105 |
| 6,593,940 B1 | | 7/2003 | Petersen et al. | |
| 6,721,941 B1 | * | 4/2004 | Morshed et al. | 717/127 |
| 6,857,120 B1 | | 2/2005 | Arnold et al. | |
| 6,954,923 B1 | * | 10/2005 | Yates et al. | 717/130 |
| 7,137,110 B1 | * | 11/2006 | Reese et al. | 717/158 |
| 7,191,433 B2 | * | 3/2007 | Narad et al. | 717/140 |
| 7,376,940 B1 | * | 5/2008 | Bush et al. | 717/149 |
| 7,428,727 B2 | * | 9/2008 | Alverson et al. | 717/134 |
| 7,458,072 B2 | * | 11/2008 | Moorthy et al. | 717/157 |
| 7,603,663 B2 | * | 10/2009 | Wu et al. | 717/151 |
| 7,634,759 B2 | * | 12/2009 | Calsyn et al. | 717/124 |
| 7,735,073 B1 | * | 6/2010 | Kosche et al. | 717/158 |
| 7,797,686 B2 | * | 9/2010 | Agarwala et al. | 717/128 |
| 7,810,083 B2 | * | 10/2010 | Chinya et al. | 717/149 |
| 7,814,463 B2 | * | 10/2010 | Dandoy | 717/125 |
| 7,853,937 B2 | * | 12/2010 | Janczewski | 717/149 |
| 8,010,954 B2 | * | 8/2011 | Little et al. | 717/149 |
| 8,032,875 B2 | * | 10/2011 | Kosche et al. | 717/158 |
| 2004/0148594 A1 | | 7/2004 | Williams | |
| 2005/0183070 A1 | | 8/2005 | Alexander et al. | |
| 2006/0053414 A1 | | 3/2006 | Bhandari et al. | |
| 2006/0288342 A1 | | 12/2006 | Hatlelid et al. | |
| 2007/0074189 A1 | | 3/2007 | Srinivas et al. | |
| 2007/0150878 A1 | | 6/2007 | Cates | |

OTHER PUBLICATIONS

Walther et al, "Using preemption in event driven systems with a single break", IEEE, pp. 384-390, 2008.*
Neves et al, "Language support for asynchronous event handling in the invocation call stack", ACM, pp. 177-180, 2011.*
Chern et al, "Debuggng with control flow breakpoints", ACM AOSD, pp. 96-106, 2007.* Chen et al, "Twig Stack: Bottom up processing of generalized tree pattern queries over XML documents", ACM VLBD, pp. 283-294, 2006.*

* cited by examiner

*Primary Examiner* — Anil Khatri
(74) *Attorney, Agent, or Firm* — Workman Nydegger (57) ABSTRACT

The claimed subject matter provides systems and mechanisms that create frame accurate call trees for threads. The system can include devices that determine the thread on which a break point or event halted execution, identifies a location of the event that halted execution, sets break points at multiple locations during a stopping event where stopping events do not typically involve setting or unsetting set break points, and constructs the frame accurate call tree subset for the thread based at least in part on the break point or event that halted execution and information gleaned from an inspection of a call stack associated with the event that halted execution or the break point.

20 Claims, 9 Drawing Sheets

BUILDING CALL TREE BRANCHES AND UTILIZING BREAK POINTS

BACKGROUND

Threads of execution, or as they are more commonly termed "threads", are a way for a program to fork (or split) itself into two or more simultaneously (or pseudo-simultaneously) running tasks. While threads of execution and processes can differ from one operating system to another, threads nonetheless are generally contained within a process and different threads of the same process typically share some resources whereas disparate processes conventionally do not share resources. Threads of execution nevertheless are similar to processes and multiple threads can be executed in parallel on most computer systems by way of multithreading that generally occurs by time slicing. On single processor systems the kernel employs time slicing to provide an illusion of simultaneity of thread execution in much the same way that the kernel utilizes time slicing with processes. On multiprocessor or multi-core systems, in contrast, threads can be run simultaneously on disparate processors or cores thereby providing true parallel processing.

One method for obtaining information to construct call trees is typically to record the method names in a call stack as a frame is entered into or exits, pushing and popping the method names onto and off a call stack as appropriate, and thereafter to use the respective call stack enters and exists to construct the call tree.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

In accordance with an aspect the claimed subject matter allows for frame accuracy in the subset call tree case where frame accuracy implies that for every frame that the claimed subject matter knows was pushed it can accurately determine if the frame has popped (e.g., the subject matter as claimed does not erroneously merge separate calls, even when made from the same call site) In prior systems which purely use information recorded from the call stack including method names call stack depth, and call site location to keep track of frame activity and build call trees, the call tree that can be constructed is a "moderately" close, but may nevertheless be an inaccurate, approximation of reality. In contrast, call trees generated using the claimed subject matter are precise and frame accurate such that when the call stacks gathered are merged together to construct a call tree the mechanism associated with gathering the call stacks ensures frame accuracy.

Moreover in a further aspect, the claimed subject matter avoids the need to track exception handling. With exception handling, when code is executing an exception handling mechanism can cause frames between the throw instruction and a frame that is protected by a catch to be popped without executing code in any method from the frames popped. For example, if one were to set break points in the return sites in the method invoked, if the method exits normally there would generally be notification that the frame had popped, but if the frame is popped because of an exception being thrown the break point would be missed. Thus an extra mechanism would be required to understand that the frames had been removed because an exception was thrown. The claimed subject matter obviates and avoids this scenario completely as it works in the same fashion regardless of how frames are popped off the call stack.

Additionally, the claimed subject matter avoids the need to read the call stack past the last common frame. Accordingly, because of the call site guards that can be implemented by the claimed subject matter, the information that typically needs to be tracked to associate the call site guards correctly with frames means that when a stopping event is encountered and the call stack up until the stopping event obtained, the call stack typically can be read or inspected by starting at the top and working down to the bottom while locating return sites. Thus, as the call stack is being investigated while noting or finding return site, it is possible to also indicate that certain frames have call site break points; one does not have to go any further as the call site break point typically indicates that the stack beneath the call site is effectively locked down and generally is similar or the exact same stack as the previous one recorded. This means that as the call stack is being probed the probing can impact memory usage in the program (e.g., memory may have to be paged in, memory cache destroyed). The subject matter as claimed avoids this by not having to venture to the bottom of the call stack.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

The following terms are used within this document as defined herein. "Break point" can, without limitation, be any mechanism that allows execution of a target process to be halted for inspection before the execution of a specified instruction in the instruction stream of the target process. Nevertheless, as employed "break point" does not generally and/or automatically imply notification to an end user of the debugger system. "Call stack" as specified herein, can be utilized to describe an ordered list of frames that can define the state of a thread of execution in the target process. "Call site" as utilized herein can describe the instruction in the instruction stream of the target process that caused a method invocation, thus pushing a frame on the "Call stack". "Call site guard" as defined herein connotes a break point placed on a call site for use in disambiguating frames as will be described below.

A call tree is typically considered a representation of the method invocations on a thread of execution. A node in a call tree generally represents a frame in the thread of execution. The children of a node in a call tree can represent ordered method invocations made from that frame. Call trees can characteristically be useful for comprehending the execution threads in target programs. Nevertheless, one drawback to providing call trees is that obtaining the information to accurately build one can generally slow down execution of the target program. In many situations the performance impact can be so deleterious as to make providing and constructing a call tree impractical. The claimed subject matter reduces the performance impact on the target program, making it practical to provide call trees in a wider set of scenarios. Moreover, the subject matter as claimed avoids the need to track exception handling within the target program.

In accordance with an aspect, the claimed subject matter can determine which frames are shared between ordered call stacks thereby providing a practical mechanism for building call trees by reducing the likely number of times an expensive operation will be required. Additionally, the claimed subject matter can construct or create frame accurate call trees for simple execution. For example, if the execution model includes exception handling (e.g., a construct typically designed to handle the occurrence of some condition that changes the normal flow of execution), then extra provisions can be made to track frame pops due to such exceptions. Nevertheless, such naïve implementations can be expensive in scenarios where hitting an event (e.g., guard break point, halt point, etc.) is the dominating expense. Consequently, the expense of such a methodology can make it impractical of many uses.

Moreover, the subject matter as claimed can provide accurate frame identity in call trees, minimal impact on the execution speed of target processes, and generally requires no extra mechanism to account for frame exits due to exception handling.

Figure 1:
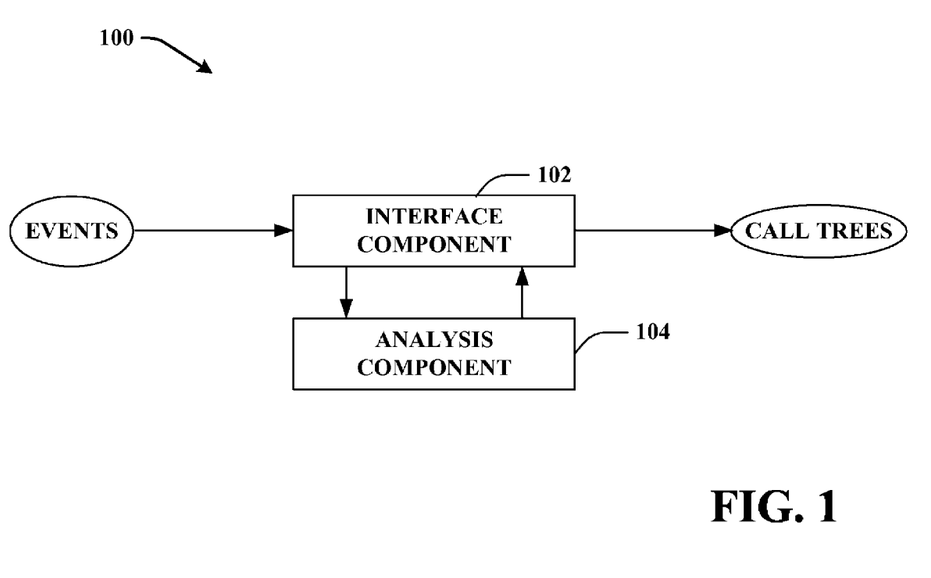
FIG. 1 illustrates a machine-implemented system that creates frame accurate call trees of a thread or frame accurate call tree subsets of the thread in accordance with the claimed subject matter.

FIG. 1 depicts a system 100 that creates frame accurate call trees (e.g., a structure, for instance a tree structure, that shows methods that were called and the order they were called from in the execution of the program, process, or thread) of a thread or frame accurate call tree subsets of the thread. System 100 includes an interface component 102 (hereinafter referred to as "interface 102") that can receive series of events $\{e(1), e(2), \ldots, e(j), \ldots\}$, where without loss of generality each event, here labeled e(i) (the number denoting the order in which the event arrived), allows inspection of the call stack of the thread at the point of the event, and the insertion of break points. It should be noted without limitation nevertheless that events do not necessary have to originate or emanate on a thread in a process. It should also be noted without limitation that utilization of break points implies modifying the program state or operating system state such that a "stopping event" can be generated before the instruction at the location on which the break point is set will be executed on any thread of execution within the program (e.g., often but not exclusively on the x86 instruction set this can be done by replacing the start or entirety of the instruction with an 'int 3' instruction). Moreover, it should further be noted without limitation that a stopping event implies that a system such as system 100 can be provided an opportunity to act on the event. In cases where system 100 is the sole debugging component it can decide to continue after event. In cases where system 100 is not the sole debugging component, other components can exercise control over whether execution continues from a stopping event.

The call stack can be an ordered list of frames $\{f(0), f(1), \ldots, f(m)\}$, representing method invocations or method calls that reached a particular stopping point, where f(i) is an earlier invocation than f(j) where i<j, and i, j, m, and n are integers equal to or greater than zero. Accordingly, f(i, e(j)) denotes the $i^{th}$ frame of the call stack gathered at event e(j). Typically the series of events $\{e(1), e(2), \ldots, e(j), \ldots\}$ can be received by interface 102 as an ordered series one event at a time. The labels e(i) applied to events do not constrain the type of event or imply events must happen in a specific order on the thread. Interface 102 upon receipt of the series of events $\{e(1), e(2), \ldots, e(i), \ldots\}$ can direct or convey each event to analysis component 104 for further processing. Once analysis component 104 has processed or partially processed the events into frame accurate call trees of a thread or frame accurate call tree subsets of the thread, interface 102 can output the frame accurate call trees of a thread or frame accurate call tree subsets of the thread up to the point of execution of the last processed event.

Interface 102 can provide various adapters, connectors, channels, communication pathways, etc., to integrate the various components included in system 100 into virtually any operating system and/or database system and/or with one another. Additionally, interface 102 can provide various adapters, connectors, channels, communication modalities, and the like, that can provide for interaction with various components that can comprise system 100, and/or any other component (external and/or internal), data, and the like, associated with system 100.

Analysis component 104 on receipt and detection of the next event in the series of events $\{e(1), e(2), \ldots, e(i), \ldots\}$ can determine on which thread a break point or event halted execution, inspect the call stack constructed up until the stopping point and ascertain the location of call sites, and appropriately insert and/or remove previously inserted break points at the ascertained call site locations. A call site is defined as the instruction that caused a frame to be pushed onto the call stack. Analysis component 104 can thereafter utilize the identity of the ascertained thread on which a break point or event halted execution, information gleaned from the call stack constructed up until the stopping event or break point, the call site locations inserted break points, if any, to construct frame accurate call trees, or accurate subset of call trees, associated with the thread As mentioned above, call stacks comprise a series of frames {f(0), f(1), . . . , f(m)} representing method calls or invocations wherein each frame, f(i), can include the following information: method(f(i, s))—the method executing on frame i at stopping event s where a stopping event "s" is either one of the ordered event e(i) or the current stopping event "c" is attributable to either an event or hitting a guard break point; return(f(i, s))—an instruction in method (f(i−1), s) that will run when the frame f(i, s) is popped; and callsite(f(i, s))—the set of instructions in method(f(i−1, e)) that could have invoked f(i, s).

As an illustrative aspect of the claimed subject matter analysis component 104, on receipt of the next event in the series {e(1), e(2), . . . , e(i), . . . } can set call site guards wherein a call site guard is a set of break points on the instructions call site. These call site guards permit analysis component 104 to use a modification of the method matching or comparison paradigm exposited above, where instead of matching, comparing, or locating similarities between method(f(j, e(i))) and method(f(j, e(k))), for example, analysis component 104 can match call sites and use call site guards to disambiguate cases were a method call down the same path can provide an incorrect determination that frames match. Accordingly, when analysis component 104 receives the next event in the series of events {e(1), e(2), . . . , e(i), . . . } it can set break points on call sites (e.g., set break points on callsite (f(j, e(i))) for all j) associated with the call stack. Thereafter until a break point in a call site guard at frame j of the call stack gathered at event e(i) (e.g., callsiteguard(f(j, e(i)))) is hit comparison at callsite(f(j, e(i))) is similar or identical to callsite(f(j, e(k))) for all j<=n, and as such analysis component 104 can infer that frame f(n, e(i)) is similar or identical to frame f(n, e(k)) (e.g., if the call sites of the call stacks match up to a specific frame and analysis component 104 has not seen a call site guard break point hit for the frames at issue, then the frames at issue can be deemed to match). Where either an event or call site guard is hit and a comparison of callsite(f(j, e(i))) and callsite(f(j, c)) where c is the current stop even yields an inequality for all x>=j then analysis component 104 can remove the call site guard at frame x of the call stack collected at event e(i) (e.g., f(x, e(i))), as frame f(x, e(i)) can no longer be a match for any subsequent frame.

Figure 2:
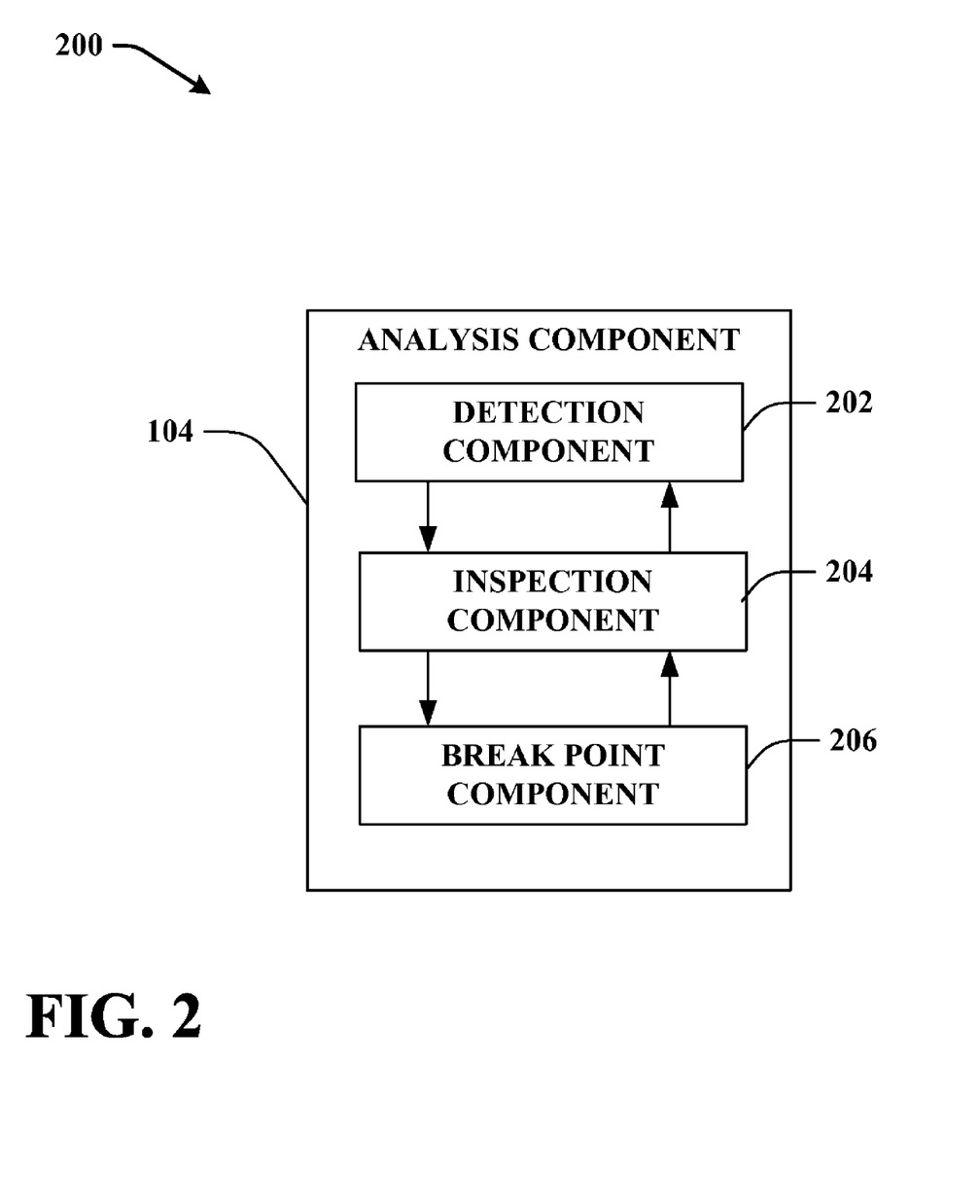
FIG. 2 provides a more detailed depiction of an illustrative analysis component in accordance with an aspect of the claimed subject matter.

FIG. 2 provides a more detailed depiction 200 of analysis component 104 in accordance with an aspect of the claimed subject matter. As illustrated analysis component 104 can include detection component 202 that detects whether or not events that are being received in the stream or series of events {e(1), e(2), . . . , e(n)} constitute a temporary halt in the execution of a program, process, or thread (e.g., determination is made as to whether or not event e(i) is a guard break point or a halting event, such as an interrupt). Where a halting event, such as a guard break point, is detected inspection component 204 can be utilized to examine the call stack that has been constructed for the particular program, process, or thread. Inspection component 204 can determine at both guard break points and events e(i) on which thread the break point or event halted execution, and the inspection of the call stack at the point of halted execution and determines call site location. Additionally, analysis component 104 can also include break point component 206 that sets or removes break points at call site locations determined by inspection component 204.

Figure 3:
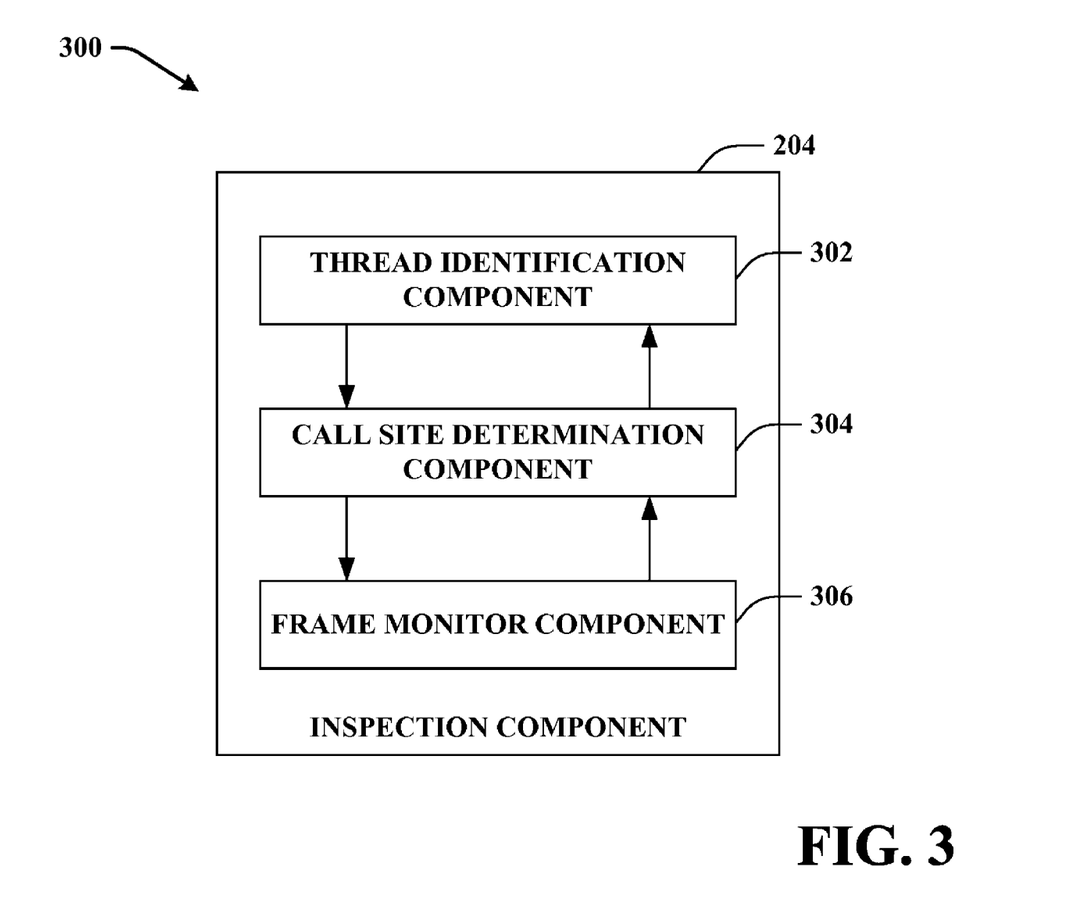
FIG. 3 provides a more detailed depiction of an illustrative inspection component in accordance with an aspect of the claimed subject matter.

FIG. 3 provides a more detailed illustration 300 of inspection component 204 in accordance with an aspect of the subject matter as claimed. As exemplified in FIG. 3 inspection component 204 can include thread identification component 302 that can identify on which thread a particular halt event e(i) or break point occurs. Further inspection component 204 can also include a call site determination component 304 that identifies appropriate locations at which to insert or remove call sites. Typically, call site determination component 304 identifies locations where a call site guard can be placed (e.g., on the instruction's callsite(f(i, e))). Such call site guards allow for a modification of the method matching solution utilized by the claimed subject matter wherein call sites are matched by utilizing the inserted call site guards to disambiguate cases where a call down the same path provides an incorrect determination that frames match. Additionally, inspection component 204 can also include frame monitor component 306 that determines whether the call sites of the call stacks match up with a specific frame and whether or not any call site guard break point has been hit for those frames in which case frame monitor component 306 can indicate that there is a frame correspondence (e.g., the frames match).

Figure 4:
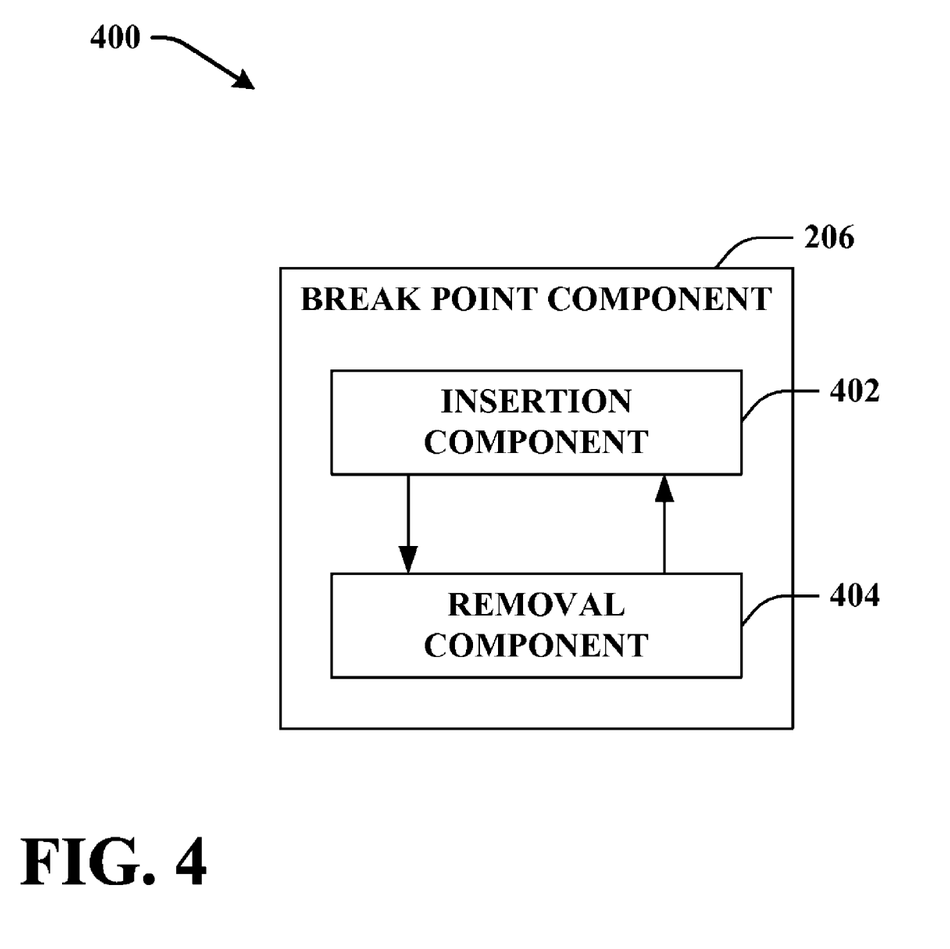
FIG. 4 provides a more detailed depiction of break point component that sets or removes break points at call site locations in accordance with an aspect of the claimed subject mater.

FIG. 4 provides further illustration 400 of break point component 206 that sets or removes break points at call site locations. Break point component 206 utilizes data received from inspection component 204 (not shown) to determine whether or not break points should be set or removed from appropriate locations. For example, in some instances break points can be provided on frame return, in other instances, break points can be established on an instructions call site. Such break points can typically be employed to match frames associated with particular events. Where it is determined that a previously set break point is of no further value (e.g., inspection component 204 can ascertain that the current stop event provides indication that there can no longer be a match by any subsequent frames) break point component 206 can remove the set or inserted break point.

To place the foregoing commentary in more perspective, the following illustrative source code and pseudo machine instruction (e.g., denoted in bold typeface) examples are provided for the purposes of context and exposition of the claimed subject matter.

```
       main( )
       {
              while(true)
              {
                     x = foo(1);
0x0    call foo
0x5    mov x, eax
                     y = foo(2);
0x7    call foo
0xb    mov y, eax
              }
0xc    jmp 0x0
       }
```

In the above source code the process commences at main( ) and proceeds through while(true) to x=foo(1) at which point the system as disclosed and claimed detects an event (e.g., when a process is interrupted or halted for any reason and at which point a call stack can be obtained). Typically a process can be halted by either hitting a break point or an interrupt of some other kind; for the purposes of the claimed subject matter it is irrelevant how the halt occurs so long as the process is interrupted in some fashion. Accordingly, when an event occurs the process is halted at which point a call stack can be obtained and the call stack merged into a call tree. On detection of an event at x=foo(1) the following call stack can be obtained:

| |
|---|
| foo + 0x0 |
| main + 0x5 | main+0x5 is the instruction that will next execute in main when foo is popped off the call stack, and foo+0x0 denotes that the process is at the commencement of the method foo. At this point a call site guard can be positioned at main+0x0. The rationale for placing the call site guard at main+0x0 is to ensure that if a subsequent call stack that states main+0x5 is encountered, whether or not the call site guard is hit indicates whether the same instance of the method foo has been encountered or a different instance of the method foo. At y=foo(2) a second event is detected or hit when foo is called from a different location in main once again a call stack can be obtained. The call stack in this instance looks like:

| |
|---|
| foo + 0x0 |
| main + 0xb |

As indicated by "main+0xb" this method invocation of foo has been called from a different place within main.

Returning back to the foregoing example, the call site guard previously established on main +0x0 can be removed as the return instruction "main+0xb" provides indication that the foo frame associated with the first event has exited; effectively the call site guard at main+0x0 was never hit, but at this stopping point (e.g., main+0xb) the call site guard placed at main+0x0 can be removed because it is no longer necessary since the second call stack:

| |
|---|
| foo + 0x0 |
| main + 0xb | is not the same as the first call stack:

| |
|---|
| foo + 0x0 |
| main + 0x5 | which implies that every frame above the first call stack is a new frame.

To put the foregoing in better perspective, the initial call to foo pushed a frame on the first call stack which was popped off by the time instruction 0x5 was executed (e.g., mov x, eax) in main, and then a call is made to foo again at 0x7 at which point an interrupting event occurs. Because an event occurs the call stack can be retrieved knowing that the original call to foo has been popped and the call site guard previously positioned in no longer needed.

Once again returning back to the illustration at hand, a new call site guard can be positioned on main+0x7. This call site guard aids in ensuring that if there is ever another call stack generated such that the bottom framesare:

| |
|---|
| foo + 0x0 |
| main + 0xb | the lack of hitting the call site guard at main+0x7 indicates that the call stacks refer to the same frames.

As will have been observed in the previous example, there were two calls within the loop and it was used to illustrate how call site guards can be removed because of the composition of a call stack. In the following illustrative source code and pseudo code machine instructions, there is only one call in the loop and illustrates the lack of encountering the call site guard confirming that frames are the same.

```
    main( )
    {
        while(true)
        {
            x = foo(1);
0x0     call foo
0x5     mov x, eax
        }
0x7     jmp 0x0
0xb     ret
    }
    foo( )
    {
        // event occurs here
        bar( );
0x0     call bar
0x5     ret
    }
    bar( )
    {
        // event occurs here
    }
```

Thus in this instance, when an event occurs the first time at x=foo(1) the call stack can look like:

| |
|---|
| foo + 0x0 |
| main + 0x5 |

At this point a call site guard can be set at main+0x0. The code segment can then continue execution until a second event is encountered when bar is invoked. The invocation of bar causes this call stack to be retrieved:

| |
|---|
| bar + 0x0 |
| foo + 0x5 |
| main + 0x5 |

As will be observed the main at the bottom of the stack (e.g., main+0x5) looks exactly the same as the previous call stack. The foo (e.g., foo+0x5) however may or may not pertain to the same foo invocation (e.g., foo+0x5 versus foo+0x0) given what is known at this point, and bar (e.g., bar+0x0) is another call. Now because the call site guard placed on main+0x0 was never hit (and thus removed) its existence provides indication that frame foo on the second call stack (e.g., foo+0x5):

| |
|---|
| bar + 0x0 |
| foo + 0x5 |
| main + 0x5 | is identical to the foo in the first call stack (e.g., foo+0x0):

```
foo + 0x0
main + 0x5
```

This indicates that frame foo+0x5 is identical to foo+0x0 rather than another instance of a call to foo pushed on the call stack.

In a further illustrative example source code and pseudo machine instruction set outlined below:

```
    main( )
    {
        while(true)
        {
            x = foo(1);
0x0     call foo
0x5     mov x, eax
        }
0x7     jmp 0x0
    }
    foo( )
    {
        // event occurs here
    }
``` the source code commences at main( ) proceeds through while(true) and encounters an event at x=foo (1) at which point the call stack that has been constructed till this juncture resembles the following:

```
foo + 0x0
main + 0x5
``` and like before a call site guard can be placed or set at x=foo(1) after which program execution can continue at which point the call site guard that was previously set at main 0x0 is hit (e.g., the call to foo is successfully made by main) at which point the stack can be depicted as follows:

```
main + 0x0
``` which effectively means that main has called foo, the call site guard has been hit, and the call to foo popped off the call stack. Having hit the set call site guard at main+0x0 the associated call site guard can be removed and program execution can continue until a second event occurs when foo is called; an event that appears similar to the previous one. When foo is called the call stack can be depicted as:

```
foo + 0x0
main + 0x5
``` and is distinguishable from the previously inspected call stack

```
main + 0x0
``` because the initial call stack guard was set, hit and removed, and the absence of the call site guard indicates that the foo frame on the current stack is not a match for any previously recorded call stack.

Figure 5:
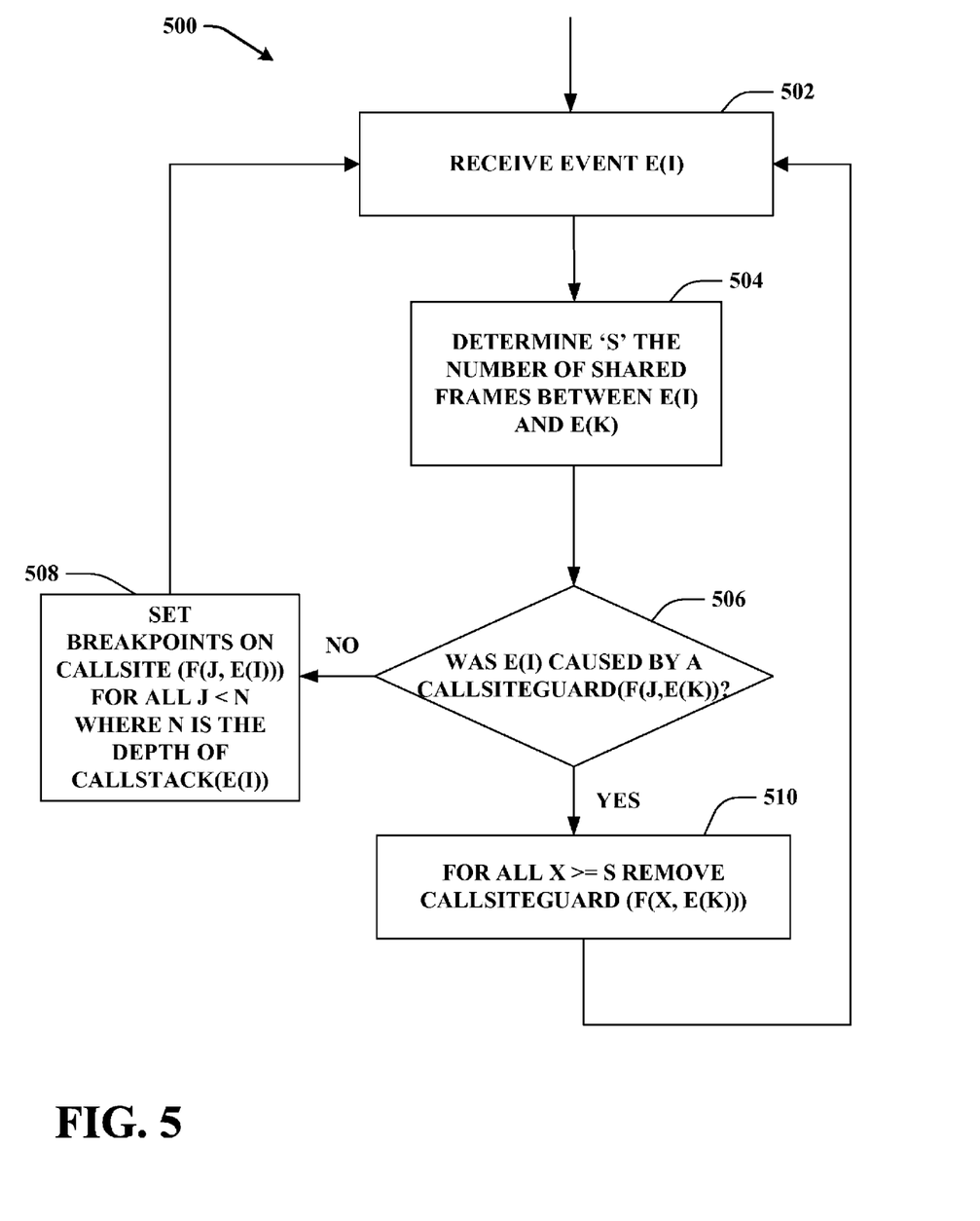
FIG. 5 illustrates a flow diagram of a machine implemented methodology that creates frame accurate trees of a thread or frame accurate call tree subsets of the thread in accordance with an aspect of the claimed subject matter.
Figure 6:
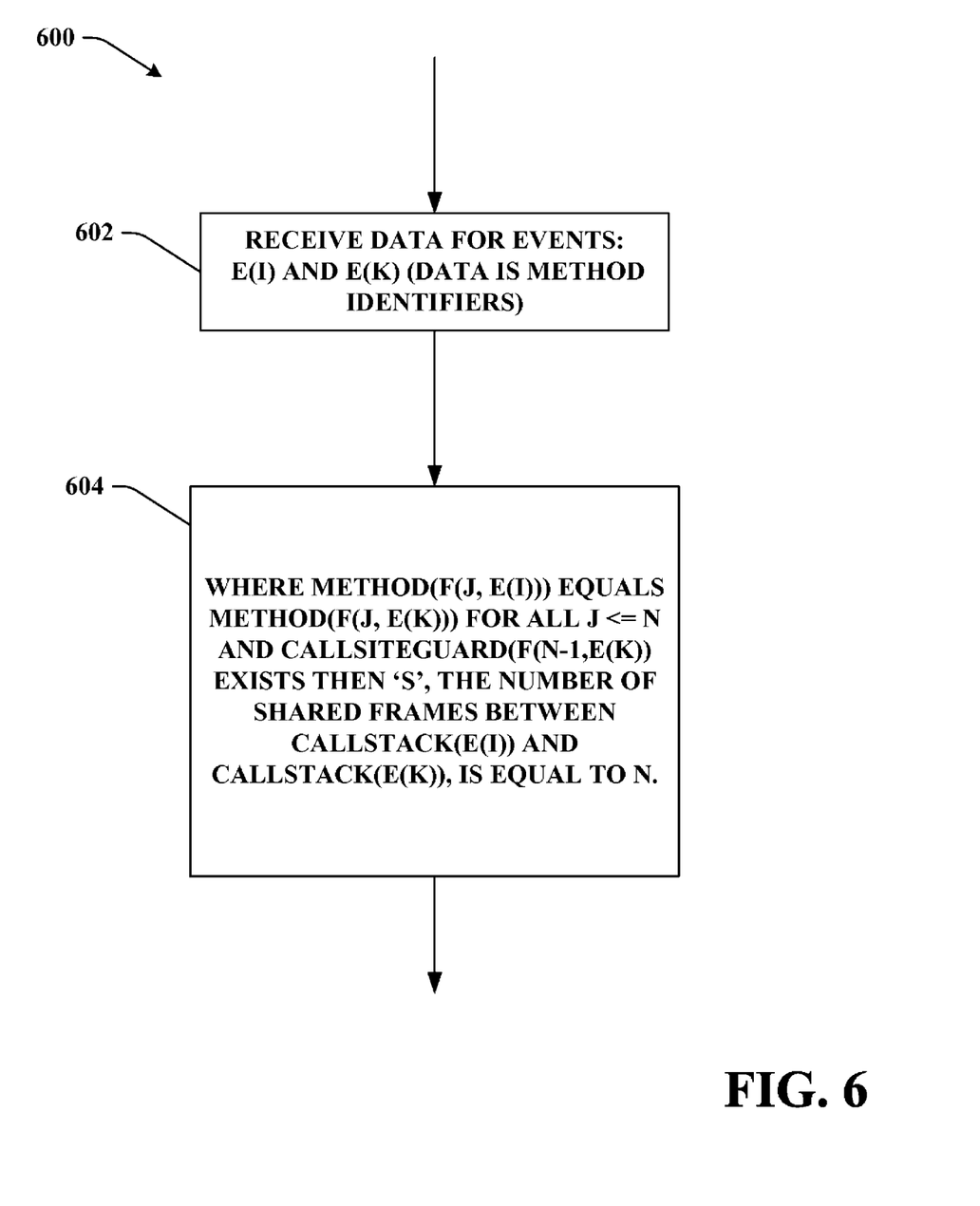
FIG. 6 illustrates a flow diagram of a machine implemented methodology that creates frame accurate call trees of a thread or frame accurate call tree subsets of the thread in accordance with an aspect of the claimed subject matter.
Figure 7:
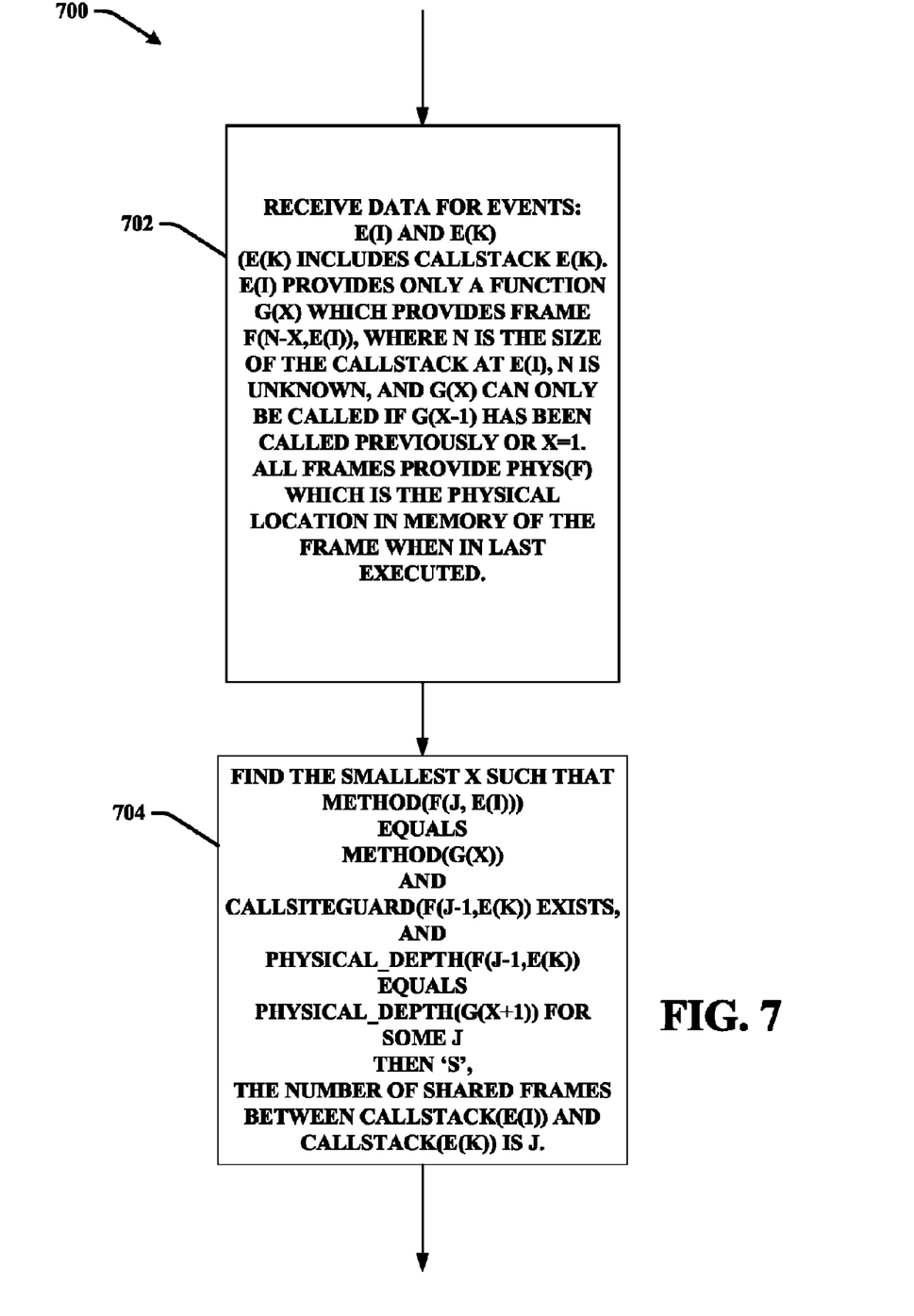
FIG. 7 illustrates a flow diagram of a machine implemented methodology that creates frame accurate call trees of a thread or frame accurate call tree subsets of the thread in accordance with an aspect of the claimed subject matter.

In view of the exemplary systems shown and described supra, methodologies that may be implemented in accordance with the disclosed subject matter will be better appreciated with reference to the flow chart of FIG. 5-7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 5 illustrates a machine implemented method 500 that creates frame accurate trees of a thread or frame accurate call tree subsets of the thread in accordance with an aspect of the claimed subject matter. Method 500 can start at 502 where the next event in a series of ordered events {e(1), e(2), ..., e(i), ...)} is received at which point method 500 can proceed to 504. At 504 'S' the number of frames shared between the call stack at event e(k) and the call stack at event e(i) is determined, where e(k) is the last event that was not due to hitting a call site guard. After the number of shared frames is determined method 500 can proceed to 506 where a determination can be made as to whether a break point has been hit at the instruction's call site or an event (e.g., e(i)) has been hit. If it is determined at 506 that a call site guard has not been hit (e.g., NO) method 500 can proceed to 508 where call site break points are set on all call sites for the frames in the call stack at event e(i). Method 500 can then proceed to the next event at 502. If at 506 it is determined that event e(i) was caused by a call site guard, then the call site guards for frames that are gone can be removed at 510. The call site guards to be removed are all callsiteguard(F(x,e(k)) where x>=S. Method 500 can then proceed to 502 where the next event can be received.

FIG. 6 illustrates an method 600 for determining the number of frames shared between two call stacks collected at different events. Method 600 can commence at 602 where full call stacks at the current event E(i) and the previous nonguard break point event E(k) can be received. At 604 a comparison can be effectuated that compares the call stacks via method name from the bottom up and uses the presence of call site guards not eliminated (e.g., in 510 of FIG. 5) to determine that the frames are identical rather than a new method invocation of the same method.

FIG. 7 illustrates an alternative or additional implementation of a method 700 for determining the number of frames shared between two call stacks collected at different events. The method can determine the number of frames shared between the two call stacks collected at different events without fully reading the call stack at the current event E(i). At 702 the call stack for E(k) the previous event not caused by a guard break point, and a function G that allows the function to receive frames from the current call stack at E(i) one at a time can be received. G(x) may only be called after G(x−1) has been called, unless x=1. Also provided or obtained at 702 is a function PHYS(f) that takes a frame and determines where it was located in physical memory. The requirement for using method 700 is that PHYS(f) may only change if Method(f) is executed while frame f is a leaf on the call stack. At 704 method 700 finds the smallest x and largest j such that the method on f(j,e(k)) is the same as the method on G(x) and the method on f(j−1,e(k)) is the same as the method G(x+1) and PHYS(f(j−1,e(k))) equals PHYS(G(x+1)). The number of shared frames is then known to be j and copies of the required information for F(y,e(k)) for y<=j can be used for F(y,e(i)) rather than invoking G.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

As used in this application, the terms "component" and "system" are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 8:
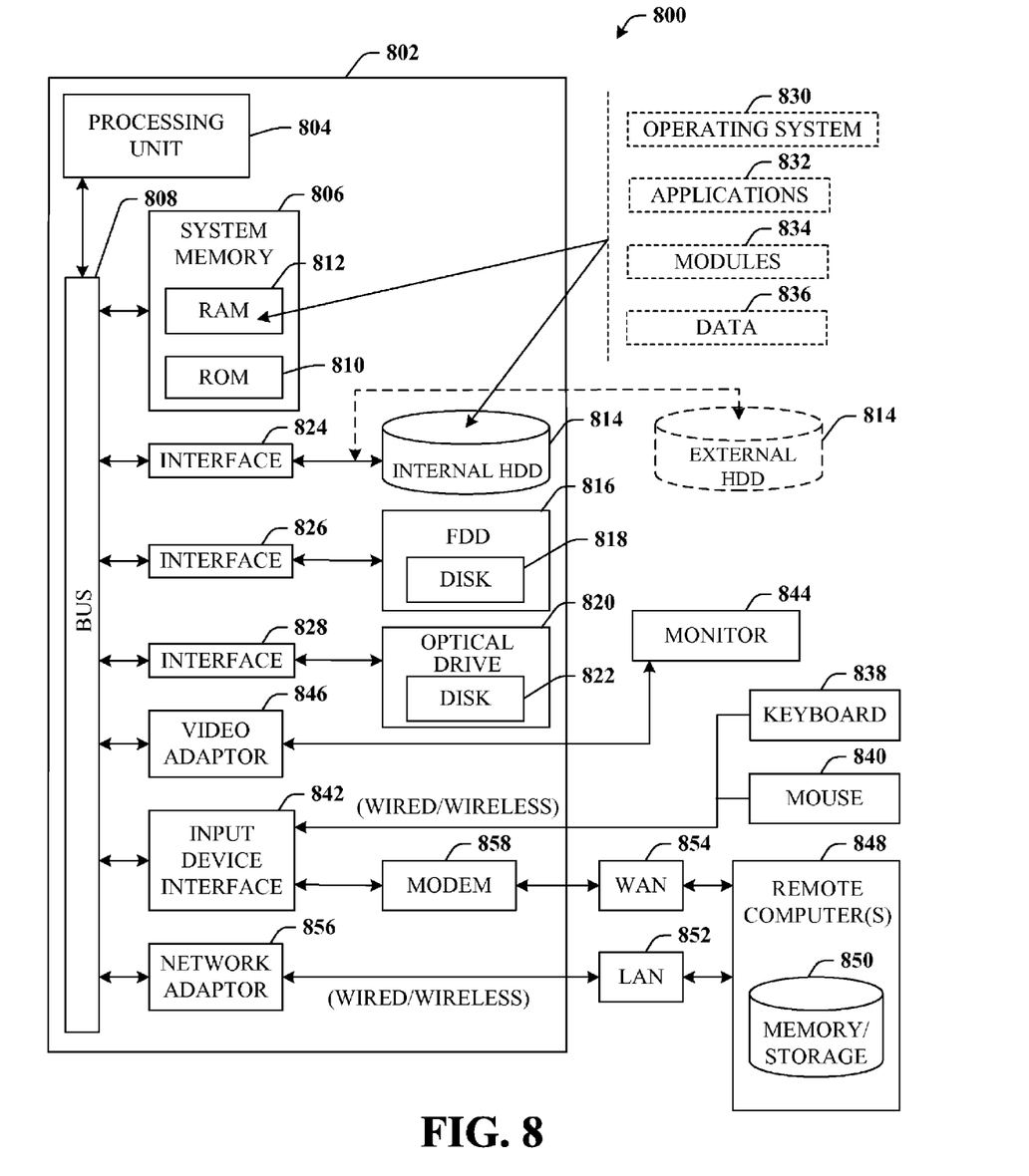
FIG. 8 illustrates a block diagram of a computer operable to execute the disclosed system in accordance with an aspect of the claimed subject matter.

Referring now to FIG. 8, there is illustrated a block diagram of a computer operable to execute the disclosed system. In order to provide additional context for various aspects thereof, FIG. 8 and the following discussion are intended to provide a brief, general description of a suitable computing environment 800 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 8, the exemplary environment 800 for implementing various aspects includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1094 interface technologies. Other external drive connection technologies are within contemplation of the claimed subject matter.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 812, including an operating system 830, one or more application programs 832, other program modules 834 and program data 836. All or portions of the operating system, applications, modules, and/or data can also be cached in the RAM 812. It is to be appreciated that the claimed subject matter can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1094 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 9:
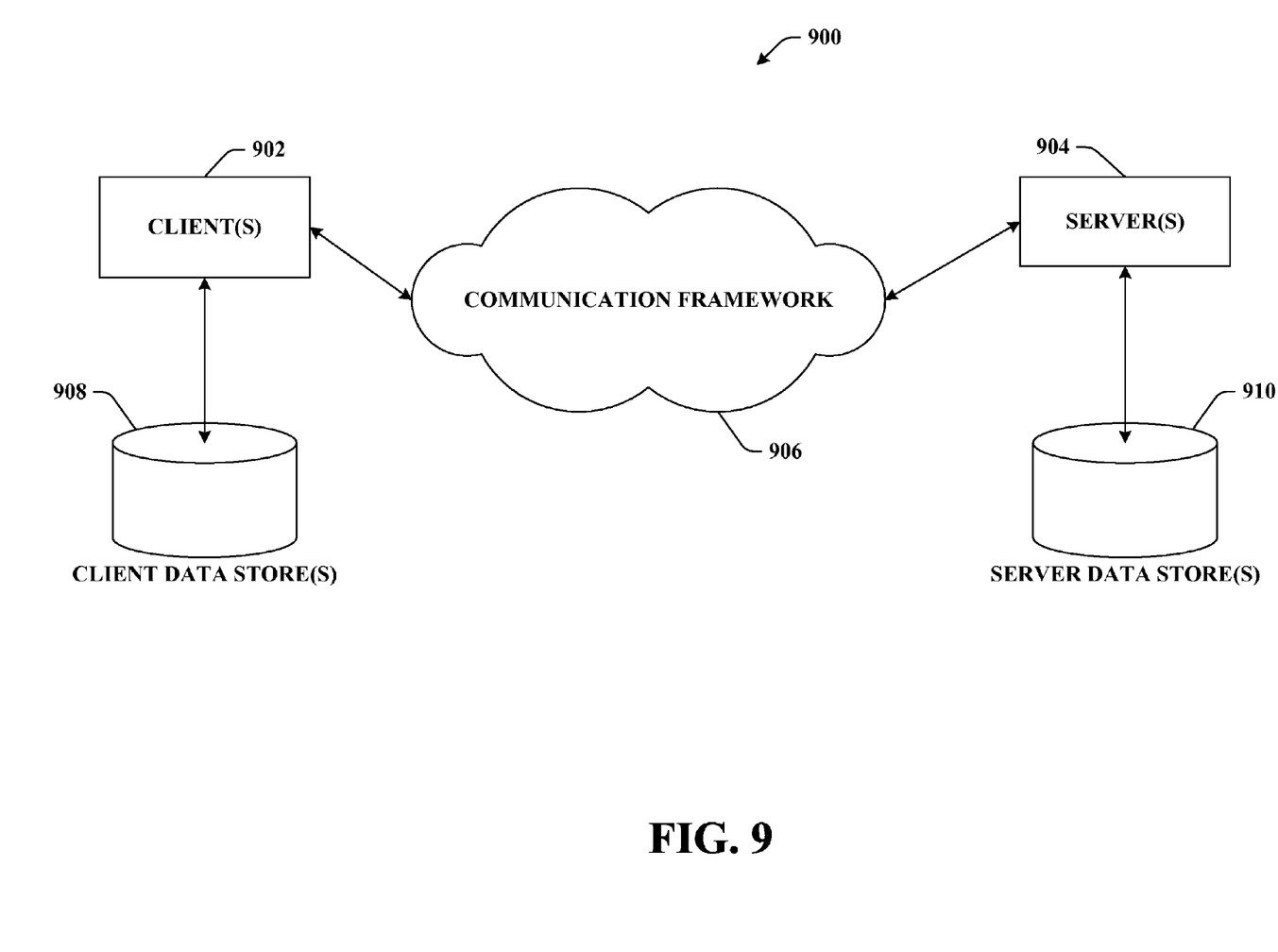
FIG. 9 illustrates a schematic block diagram of an exemplary computing environment for processing the disclosed architecture in accordance with another aspect.

Referring now to FIG. 9, there is illustrated a schematic block diagram of an exemplary computing environment 900 for processing the disclosed architecture in accordance with another aspect. The system 900 includes one or more client(s) 902. The client(s) 902 can be hardware and/or software (e.g., threads, processes, computing devices). The client(s) 902 can house cookie(s) and/or associated contextual information by employing the claimed subject matter, for example.

The system 900 also includes one or more server(s) 904. The server(s) 904 can also be hardware and/or software (e.g., threads, processes, computing devices). The servers 904 can house threads to perform transformations by employing the claimed subject matter, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system that creates a frame accurate call tree subset for a thread, comprising:
   at least one processor; and
   a storage medium having stored computer-executable instructions which, when executed by the at least one processor, cause the computing system to implement the following:
   receiving an ordered stream of events, including a first event and a second event,
   determining a number of shared frames between call stacks associated with a first event and a second event by utilizing a break point set at a call site location, the number of shared frames between call stacks associated with the first event and the second event also being determined by comparing a call stack associated with the first event with a call stack associated with the second event based at least in part on a method identifier, the comparing occurring from a bottom up and utilizing a presence of a call site guard to indicate a similarity of frames between the call stacks associated with the first event and the second event,
   constructing a frame accurate call tree subset for the thread based at least in part on the break points set at the call site locations and information gleaned from an inspection of a call stack associated with the first event and a call stack associated with the second event, the constructing further comprising determining whether a method invocation associated with the first or second event corresponds with a method invocation associated with another event, and
   outputting the frame accurate call tree subset.

2. The system of claim 1, each event in the ordered stream of events allow for inspection of the call stack of the thread at the point of the event that halted execution.

3. The system of claim 1, the call stack associated with the event that halted execution is an ordered list of frames, each frame in the ordered list of frames represents one or more method invocation extant at the point that the event halted execution.

4. The system of claim 1, each frame in the ordered list of frames, except the last, includes an instruction associated with the method invocation that caused the next frame in the list that halted execution.

5. The system of claim 1, the break points inserted into a code fragment proximate to the frames on the call stack of the event that halted execution.

6. The system of claim 1, the number of shared frames between the call stack associated with the first event and a current call stack associated with the second event determined without reading past a frame located immediately above a shared frame on the current call stack.

7. The system of claim 1, wherein the determining includes determining one or more method invocations associated with the first event is similar to one or more method invocations associated with the second event.

8. The system of claim 1, the component on, at least one of, ascertaining a lack of a call site guard inserts call site break points on all call sites for the call stack associated with a current event, or determining an existence of the call site guard removes the call site guard for past frames.

9. A method implemented on a computing system that includes at least one processor and at least one storage medium having stored instructions for implementing the method when executed by the at least one processor, the method comprising:

the computing system receiving a plurality of events, including at least a first event and a second event;

the computing system processing the events into frames of corresponding first and second call stacks;

the computing system determining a number of shared frames between a first event and a second event based at least in part on a presence or absence of a break point within the first or second call stacks, the determining including employing the break point to identify a dissimilarity between a first frame and a second frame; and the computing system constructing and outputting a frame accurate call tree subset for a thread of execution based at least in part on a break point and data acquired from an inspection of a first call stack associated with the first event and a second call stack associated with the second event, the constructing further comprising determining whether a method invocation associated with the first or second event corresponds with a method invocation associated with another event.

10. The method of claim 9, the constructing further comprising inspecting the first call stack associated with the first event that halted execution or the break point that halted execution.

11. The method of claim 10, the first call stack includes an ordered list of frames, each frame includes an instruction that caused the method invocation next in the list of frames excepting the final frame, the first call stack indicates a thread state at a stopping event.

12. The method of claim 9, the determining further comprises utilizing the break point established at a call site location.

13. The method of claim 9, the determining further includes identifying a number of shared frames between the first call stack associated with the first event and a current call stack associated with the current event without reading past a frame located above a shared frame on the current call stack.

14. The method of claim 9, the constructing further comprising determining a method invocation associated with the first event corresponds with a method invocation associated with the second event.

15. The method of claim 9, the dissimilarity utilized to remove the break point positioned prior to the method invocation.

16. The method of claim 9, further comprising affiliating a break point with an instruction after a call site instruction and utilizing an identity to a first and second method call to infer that a second frame is similar to a first frame.

17. A computing system that creates a frame accurate call tree subset for a thread, comprising:

at least one processor; and a storage medium having stored computer-executable instructions which, when executed by the at least one processor, cause the computing system to implement the following:

receiving an ordered stream of events, including a first event and a second event, determining a number of shared frames between call stacks associated with a first event and a second event by utilizing a break point set at a call site location, performing at least one of the following: (1) upon ascertaining a lack of a call site guard in a call stack, inserting call site break points on all call sites for the call stack associated with a current event, or (2) upon determining an existence of the call site guard, removing the call site guard for past frames, constructing a frame accurate call tree subset for the thread based at least in part on the break points set at the call site locations and information gleaned from an inspection of a call stack associated with the first event and a call stack associated with the second event, the constructing further comprising determining whether a method invocation associated with the first or second event corresponds with a method invocation associated with another event, and outputting the frame accurate call tree subset.

18. A method implemented on a computing system that includes at least one processor and at least one storage medium having stored instructions for implementing the method when executed by the at least one processor, the method comprising:

the computing system receiving a plurality of events, including at least a first event and a second event;

the computing system processing the events into frames of corresponding first and second call stacks;

the computing system determining a number of shared frames between a first event and a second event based at least in part on a presence or absence of a break point within the first or second call stacks and by at least affiliating the break point with an instruction after a call site instruction and utilizing an identity to a first and second method call to infer that a second frame is similar to a first frame; and the computing system constructing and outputting a frame accurate call tree subset for a thread of execution based at least in part on a break point and data acquired from an inspection of a first call stack associated with the first event and a second call stack associated with the second event, the constructing further comprising determining whether a method invocation associated with the first or second event corresponds with a method invocation associated with another event.

19. One or more storage medium having stored computer-executable instructions for implementing a method when executed by at least one processor of a computing system, the method comprising:

the computing system receiving a plurality of events, including at least a first event and a second event;

the computing system processing the events into frames of corresponding first and second call stacks;

the computing system determining a number of shared frames between a first event and a second event based at least in part on a presence or absence of a break point within the first or second call stacks, the determining including employing the break point to identify a dissimilarity between a first frame and a second frame; and the computing system constructing and outputting a frame accurate call tree subset for a thread of execution based at least in part on a break point and data acquired from an inspection of a first call stack associated with the first event and a second call stack associated with the second event, the constructing further comprising determining whether a method invocation associated with the first or second event corresponds with a method invocation associated with another event.

20. One or more storage medium having stored computer-executable instructions for implementing a method when executed by at least one processor of a computing system, the method comprising:

the computing system receiving a plurality of events, including at least a first event and a second event;

the computing system processing the events into frames of corresponding first and second call stacks;

the computing system determining a number of shared frames between a first event and a second event based at least in part on a presence or absence of a break point within the first or second call stacks and by at least affiliating the break point with an instruction after a call site instruction and utilizing an identity to a first and second method call to infer that a second frame is similar to a first frame; and the computing system constructing and outputting a frame accurate call tree subset for a thread of execution based at least in part on a break point and data acquired from an inspection of a first call stack associated with the first event and a second call stack associated with the second event, the constructing further comprising determining whether a method invocation associated with the first or second event corresponds with a method invocation associated with another event.

* * * * *